United States Patent [19]

Adachi et al.

[11] Patent Number: 4,840,100

[45] Date of Patent: Jun. 20, 1989

[54] TONE SIGNAL GENERATION DEVICE FOR AN ELECTRIC MUSICAL INSTRUMENT

[75] Inventors: Takeshi Adachi; Kazuo Masaki, both of Hamamatsu, Japan

[73] Assignee: Yamaha Corporation, Hamamatsu, Japan

[21] Appl. No.: 61,707

[22] Filed: Jun. 11, 1987

[30] Foreign Application Priority Data

Jun. 13, 1986 [JP] Japan ............................. 61-136313

[51] Int. Cl.$^4$ ........................ G01H 1/02; G01H 1/00

[52] U.S. Cl. ..................................... 84/1.19; 84/1.27; 84/1.01; 84/DIG. 9; 333/14

[58] Field of Search ........................ 84/1.19, 1.2, 1.21, 84/1.27, DIG. 9, 1.01; 381/94, 71, 106, 13; 364/724; 307/520, 264; 328/162, 165, 167; 333/14

[56] References Cited

U.S. PATENT DOCUMENTS

| | | | |
|---|---|---|---|
| 4,200,889 | 4/1980 | Strobele | 333/14 X |
| 4,363,006 | 12/1982 | Ishigaki et al. | 381/94 X |
| 4,363,007 | 12/1982 | Haramoto et al. | 381/94 X |
| 4,416,179 | 11/1983 | Wachi | 84/1.01 X |
| 4,507,791 | 3/1985 | Gundry | 333/14 X |
| 4,539,884 | 9/1985 | Aoki | 84/1.01 X |
| 4,554,858 | 11/1985 | Wachi et al. | 84/1.19 |
| 4,700,361 | 10/1987 | Todd et al. | 333/14 X |
| 4,706,537 | 11/1987 | Oguri | 84/1.26 X |
| 4,738,179 | 4/1988 | Suzuki | 84/1.26 X |
| 4,760,602 | 7/1988 | Gibson et al. | 333/14 X |
| 4,785,702 | 11/1988 | Katoh | 84/1.26 X |

*Primary Examiner*—Arthur T. Grimley
*Assistant Examiner*—Matthew S. Smith
*Attorney, Agent, or Firm*—Spensley Horn Jubas & Lubitz

[57] ABSTRACT

In storing digital tone waveshape data in a waveshape memory, sampled tone waveshape data is stored in the memory by previously elevating the level of frequency components in a predetermined high frequency region. This predetermined high frequency region corresponds to a frequency region to which quantization noise components belong. The tone waveshape data stored in the waveshape memory in this manner has the signal level of the component of the region including the quantization noise components reinforced as compared with the original tone waveshape. The tone waveshape data read out from the waveshape memory is applied to a filter of a characteristic which restrains the level of the component in the predetermined high frequency region. The level of the quantization noise components belonging to the predetermined high frequency region contained in the tone waveshape data thereby is restrained. On the other hand, the level of the signal components of the predetermined high frequency region is restored to the original level by this restraining of the level. Thus, the quantization noise can be eliminated without impairing the level of the signal component.

9 Claims, 1 Drawing Sheet

TONE SIGNAL GENERATION DEVICE FOR AN ELECTRIC MUSICAL INSTRUMENT

BACKGROUND OF THE INVENTION

This invention relates to a tone signal generation device used in an electronic musical instrument and other musical tone generation devices and, more particularly, to removal of a quantization noise contained in high frequency components of a tone generated from a tone signal generation device of a type in which a tone waveshape of plural periods is stored in a memory and a tone signal is generated by reading out the stored waveshape.

It has heretofore been practiced to store a full waveshape from the start of sounding of a tone to the end thereof or a waveshape of suitably selected plural periods in a memory and generate a tone signal of a high quality by reading out the stored waveshape (see e.g., U.S. Pat. No. 4,520,708).

In the system in which a tone waveshape is sampled with a limited resolution and stored in a memory, there arises the problem that a quantization noise is unavoidably contained in a high frequency region. For removing the quantization noise, it is conceivable to employ a filter of characteristics which attenuate high frequency components in the tone signal. This approach however is not desirable because signal components in the high frequency region also are removed by the filter. In actuality, there has not been made any effective proposal to remove such quantization noise.

SUMMARY OF THE INVENTION

It is, thereofore, an object of the present invention to provide a tone signal generation device capable of generating a tone signal while restraining the quantization noise in the tone signal.

For achieving the object of the invention, the tone signal generation device according to the invention comprises memory means for storing waveshape data representing a tone waveshape having plural periods, the level of frequency components constituting said tone waveshape being previously elevated in a predetermined high frequency region corresponding to a frequency region to which quantization noise components of said tone waveshape belong, reading means for reading out said waveshape data from memory means, and filter means for receiving the tone waveshape and for restraining a high frequency level which is the level of the components in the predetermined high frequency region, thereby the quantization noise being eliminated without impairing the level of the signal component.

In the memory means is stored not a desired original tone waveshape itself but data of a tone waveshape having a characteristic according to which the level of a high frequency component in a predetermined high frequency region in the original tone waveshape has been elevated. The data of the tone waveshape stored in this memory means is read out by the reading means. A tone signal produced in accordance with the read out data of the tone waveshape contains the quantization noise components. Since, however, the level of the signal components in the predetermined high frequency region corresponding to the frequency region of this quantization noise components has been elevated from that of the original tone waveshape, the level of the signal components in this high frequency region is sufficiently higher than the level of the quantization noise components in the same region. This tone signal is then applied to filter means where the levels of the signal components and the quantization noise components in the high frequency region are respectively restrained in accordance with filter characteristics for restraining the level of components in the high frequency region determined for this filter means. Owing to this filtering, the quantization noise components in the tone signal can substantially be removed. On the other hand, since the signal components in the high frequency region in the tone signal have become of a sufficiently higher level than the noise level by the elevation of the level effected prior to the filtering, the signal components are not lost but are rather adjusted to a proper level (e.g., about the same level as that of the original tone waveshape) by reduction of the level by the amount which is equivalent to the amount of elevation from the the level of the original tone waveshape.

According to the present invention, therefore, there is stored in a waveshape memory data of a tone waveshape of plural periods having a characteristic according to which the level of frequency components in a predetermined high frequency region corresponding to quantization noise components has previously been elevated and a tone signal provided in accordance with the data of the tone waveshape read out from the memory is applied to a filter having filter characteristics for restraining the level of components in the predetermined high frequency region. Accordingly, the quantization noise components are removed by the filter while the signal components in the high frequency region are adjusted to a proper level by the filter owing to the fact that the signal components in the high frequency region have previously been elevated in its level. Thus, a tone signal of a high quality in which the quantization noise only has been removed can be generated.

A preferred embodiment of the invention will now be described with reference to the accompanying drawings.

BRIEF DESCRIPTION OF THE DRAWINGS

In the accompanying drawings.

DESCRIPTION OF A PREFERRED EMBODIMENT

Figure 1:
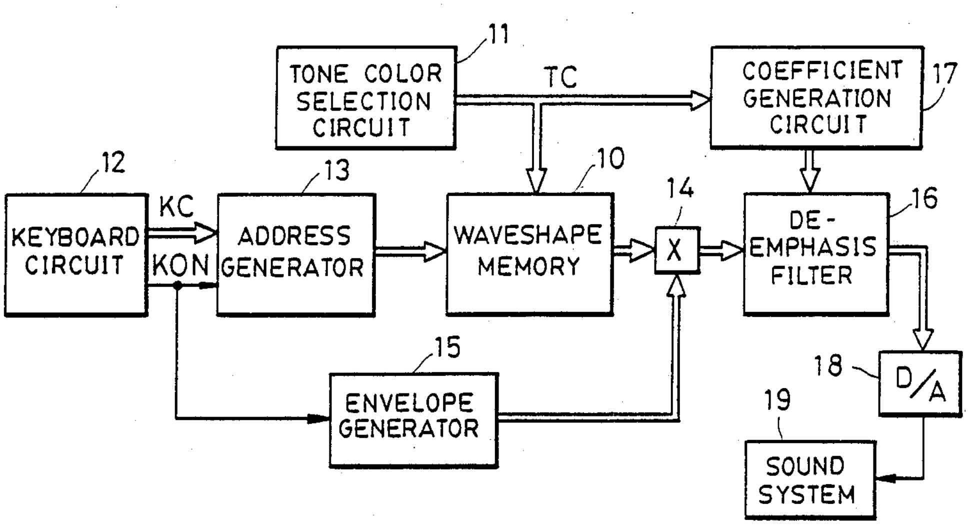
FIG. 1 is a block diagram showing an embodiment of the tone signal generation device according to the invention.

Referring to FIG. 1, a waveshape memory 10 stores data of tone waveshapes of plural periods in correspondence to various tone colors which can be selected by a tone color selection circuit 11. The tone waveshapes corresponding to the data stored in this memory have a characteristic according to which the level of a frequency component in a predetermined high frequency region corresponding to a frequency region of quantization noise components has previously been elevated. One of the tone waveshapes stored in the waveshape memory 10 corresponding to the tone color which has been selected by the tone color selection circuit 11 can be read out and the data of this tone waveshape is read out from the waveshape memory 10 by reading means consisting of a keyboard circuit 12 and an address generator 13.

The keyboard circuit 12 comprises key switches for respective keys in the keyboard and outputs a key code KC and a key-on signal KON representing a key depressed in the keyboard. A monophonic musical instrument includes a known circuit for preferentially selecting a single tone in the keyboard circuit 12 and a polyphonic musical instrument includes a known key assigner in the keyboard circuit 12. In the following description, explanation will be made on the assumption that the invention has been applied to a monophonic musical instrument. The address generator 13 generates phase address data which changes at a rate corresponding to the tone pitch of a tone to be generated in accordance with the key code KC provided by the keyboard circuit 12. Sequential sample point amplitude data of a tone waveshape stored in the waveshape memory 10 is read out sequentially and successively in accordance with this phase address data.

Specific details of reading of the waveshape memory 10 by the address generator 13 differs depending upon the waveshape of plural periods stored in the waveshape memory 10. If, for example, a full waveshape from the start of sounding of a tone to the end thereof is stored, the address generator 13 generates address data in such a manner that the full waveshape is read out from the beginning to the end. If a waveshape of plural periods in an attack portion and a waveshape of plural periods in a sustain portion are stored, the address generator 13 generates the address data in such a manner that the waveshape of the attack portion is read out once and then the waveshape of the sustain portion is repeatedly read out. Thus, by reading of the waveshape of plural periods stored in the waveshape memory 10 once or repeatedly in accordance with the output of the address generator 13, a tone signal corresponding to depression of a key is generated.

A tone signal generated in accordance with the read out output of the waveshape memory 10 is supplied to a multiplier 14 where the tone signal multiplied with envelope shape data generated from an envelope generator 15 in response to the key-on signal KON. The tone signal imparted with an envelope in this manner is applied to a de-emphasis filter 16. This de-emphasis filter 16 consists of a digital filter and its amplitude and frequency characteristics are determined in accordance with a filter coefficient supplied by a coefficient generation circuit 17. The characteristics of this filter 16 are determined to such characteristics as can restrain the level of a component in a predetermined high frequency region. The output signal of the filter 16 is converted to an analog signal by a digital-to-analog converter 18 and thereafter is supplied to a sound system 19.

Figure 2:
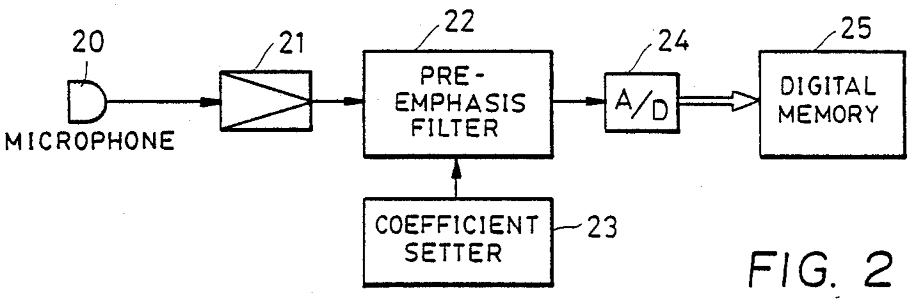
FIG. 2 is a block diagram showing an example of a device for forming tone waveshape data to be stored in a waveshape memory shown in FIG. 1.

Data of a tone waveshape to be stored in the waveshape memory 10 is formed by employing, for example, a device as shown in FIG. 2. A tone corresponding to a desired original tone waveshape (e.g., a tone played by a natural musical instrument) is picked up by a microphone 20 and applied to a pre-emphasis filter 22 through an amplifier 21. This pre-emphasis filter 22 which is an analog filter can be set to desired filter characteristics by suitably determining its filter characteristics by a coefficient setter 23. The pre-emphasis filter 22 is set to filter characteristics according to which the amount of attenuation in the amplitude in a predetermined high frequency region corresponding to a frequency region of a quantization noise component is smaller than the amount of attenuation in the amplitude in a region of a lower frequency. This causes the pre-emphasis filter 22 to produce a tone waveshape signal whose characteristic is such that a relative level of a frequency component in said predetermined high frequency region in the input original tone waveshape signal has been elevated from its original relative level. The tone waveshape signal provided by the pre-emphasis filter 22 is converted to a digital signal by an analog-to-digital converter 24 and thereafter is stored in a digital memory 25.

Typically the tone waveshape stored in this digital memory 25 is a full waveshape from the start of sounding of a tone to the end thereof and is imparted with the same amplitude envelope as in the original tone. The tone waveshape stored in the digital memory 25 is stored in the waveshape memory 10 shown in FIG. 1 either directly or after suitable modification. In subjecting the waveshape to modification, known waveshape data processing techniques may be employed as desired.

For example, there are waveshape data processing techniques such as (1) A continuous waveshape of plural periods of an attack portion and a suitable continuous or non-continuous waveshape of plural periods of a sustain portion are taken out of a tone waveshape stored in the digital memory 25. Data of the waveshape of plural periods of the attack portion and data of the waveshape of plural periods of the repeated portion are prepared in accordance with the taken out waveshapes and these waveshape data are stored in the waveshape memory 10 in FIG. 1;

(2) A processing is performed for normalizing a peak level of each wave in the waveshape data to be stored in the waveshape memory 10 in FIG. 1 to a predetermined level;

(3) In a case where the waveshape data of plural periods of the attack portion and the waveshape data of plural periods of the repeated portion are stored in the waveshape memory 10 as described in (1) above, interpolation is made so that a connection in the waveshape between the attack portion and the repeated portion and a connection in the waveshape between the repeated portions become smooth; and (4) As the coding system of the waveshape data to be stored in the waveshape memory 10 in FIG. 1, one of coding systems such as DPCM (difference pulse code modulation), ADPCM (adaptive DPCM), DM (delta modulation), ADM (adaptive Delta Modulation) and LPC (Linear Predictive Coding) may be employed instead of PCM (pulse code modultion).

The processing of the waveshape data may be made by employing one of these waveshape data processing techniques or by a combined use of these techniques. In this case, circuit design of a circuit for accessing the waveshape memory 10 and circuits provided on the output side thereof are suitably modified in order to enable a proper reading and decoding in accordance with contents of the processing, i.e., mode, or state or the coding system of the tone waveshape stored in the waveshape memory 10.

Figure 3:
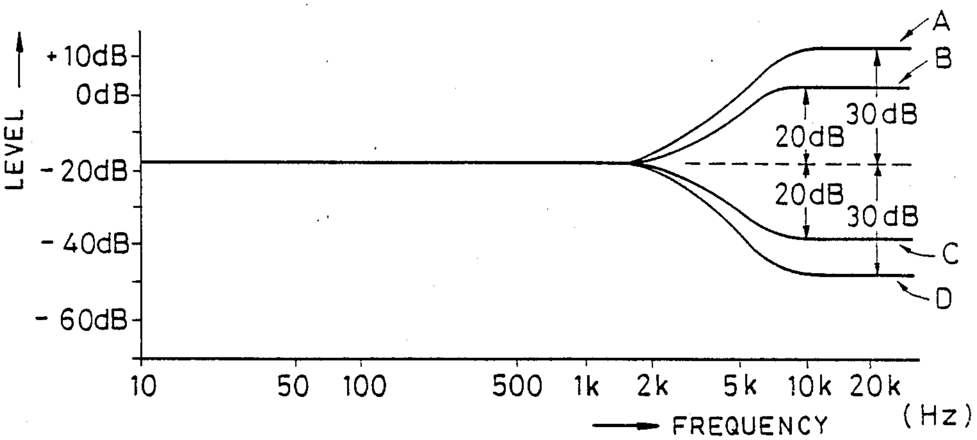
FIG. 3 is a diagram showing an example of filter characteristics of a pre-emphasis filter and a deemphasis filter in FIG. 1.

An example of filter characteristics of the preemphasis filter 22 and the de-emphasis filter 16 is shown in FIG. 3. Curves A and B indicate two different characteristics of the pre-emphases filter 22 and curves C and D two different characteristics of the de-emphasis filter 16.

In the characteristic A, the level of a frequency region below about 1.5 kHz is −20 dB, the level gradually increases from −20 dB to +10 dB as the frequency increases in a region from about 1.5 kHz to about 10 kHz and is maintained at +10 dB in a region above about 10 kHz. By this characteristic, the level in the high frequency region is elevated by 30 dB as compared with the level in the low frequency region. In the characteristic B, the level of a low frequency region below about 1.5 kHz is −20 dB, the level gradually increses from −20 dB to 0 dB as the frequency increases in a region from about 1.5 kHz to about 10 kHz and the level is maintained at 0 dB in a region above about 10 kHz. By this characteristic, the level of the component in the high frequency region is elevated by 20 dB as compared with the level in the low frequency region. In this case, the quantization noise is not present in the low frequency region below about 1.5 kHz but appears and increases gradually in the region from about 1.5 kHz to about 10 and is present abundantly in the frequency region above about 10 kHz. Accordingly, as the predetermined high frequency region containing the frequency region of the quantization noise, the region from about 1.5 kHz to about 10 kHz and the region above about 10 kHz have been selected.

In the characteristic C, the level is −20 dB in the low frequency region below about 1.5 kHz, the amount of attenuation gradually increases from −20 dB to −40 dB as the frequency increases in a region from about 1.5 kHz to about 10 kHz and the level is maintained at −40 dB in a region above about 10 kHz. The level of a component in the high frequency region is restrained by 20 dB as compared with the level in the low frequency region. In the characteristic D, the level is −20 dB in the low frequency region below about 1.5 kHz, the level increases gradually from −20 dB to −50 dB as the frequency increases in a region from about 1.5 kHz to about 10 kHz and the level is maintained at −50 dB in a region above about 10 kHz. By this characteristics, the level of the component in the high frequency region is restrained by 30 dB as compared with the level in the low frequency region.

As will be understood from the drawings, the characteristics of the de-emphasis filter 16 are establised in such a manner that the level is restrained in a frequency region corresponding to the frequency region in which the level has been elevated by the pre-emphasis filter 22. By restraining the same amount of level as has been elevated, e.g., restraining the level in the characteristic D when the level has been elevated in the characteristic A or restraining the level in the characteristic C when the level has been elevated in the characteristic B, the level of the signal component in the high frequency region which has been reinforced in the characteristic A or B is attenuated by the same amount in the characteristic D or C with a result that a tone signal having the same level characteristic of the high frequency region as that of the original tone waveshape (the characteristic of components in a lower frequency region is also the same as the original tone waveshape). On the other hand, the quantization noise component is restrained and removed in accordance with the characteristic in the de-emphasis filter 16 which restrains the level of the high frequency component.

The amount of the elevated level need not necessarily be the same as the amount of the restrained level. If, for example, the level is restrained in the characteristic C with respect to a tone waveshape whose level has been elevated in the characteristic A, the level of a signal component in the high frequency region has been reinforced by 10 dB so that a tone signal having a characteristic in which the level of the high frequency component has been reinforced as compared with the original tone can be obtained. The tone signal obtained in this manner is of a more brilliant tone color than the original tone. In this case also, the quantization noise component only is restrained and removed in accordance with the characteristic which restrains the level of the high frequency component in the de-emphasis filter 16. If the level is restrained in the characteristic D with respect to a tone waveshape whose level has beeen elevated in the characteristic B, the level of the signal component in the high frequency region has been reduced by 10 dB so that a tone signal having a characteristic in which the level of the high frequency component has been somewhat reduced as compared with the original tone. In this case also, the quantization noise component only is restrained and removed in accordance with the characteristic which restrains the level of the high frequency component in the de-emphasis filter 16.

The above described relationship between the amount of the elevated level and the amount of restrained level in the pre-emphasis filter 22 and the de-emphasis filter 16 may be suitably determined in accordance with the tone color (or other suitable control parameter). For this purpose, the filter coefficient established by a coefficient setter 23 shown in FIG. 2 may be suitably changed in accordance with the tone color of a tone to be sampled by a microphone 20 thereby to suitably change the amount of the elevated level of the high frequency component (e.g., by selecting either the characteristic A or B in FIG. 3). Further, a tone color code TC selected by the tone color selection circuit 11 in FIG. 1 may be supplied to the coefficient generation circuit 17 and the filter coefficient generated by this coefficient generation circuit 17 may be suitably changed in accordance with the selected tone color to suitably change the amount of the restrained level of the high frequency component (e.g., by selecting either the characteristic C or D in FIG. 3).

The waveshape memory 10 may be composed by a ROM or a RAM. A device for sampling an external sound as shown in FIG. 2 may be incorporated into a tone signal generation device as shown in FIG. 1 to utilize the tone signal generation device as the sampling musical instrument. In this case, the waveshape memory 10 is composed of a RAM and a tone waveshape which has been filtered so that its level of the frequency component in the high frequency region has previously been elevated by the pre-emphasis filter 22 is written in the waveshape memory 10.

In the above described embodiment, an analog filter is used for the pre-emphasis filter 22 and a digital filter is used for the de-emphasis filter 16. Both of the filters 22 and 16 may however be constructed of either one of an analog filter and a digital filter. For example, the location of the de-emphasis filter 16 may be shifted to the output side of the digital-to-analog converter 18 of FIG. 1. In this case, the de-emphasis filter 16 is an analog filter. Similarly, the location of the pre-emphasis filter 22 may be shifted to the output side of the analog-to-digital converter 24 of FIG. 2. In this case, the pre-emphasis filter 22 is constructed of a digital filter.

In a polyphonic type musical instrument, the address generator may be operated on a time shared basis for plural channels and outputs of the waveshape memory 10 read out on a time shared basis for the respective channels may be mixed together and thereafter applied to the de-emphasis filter 16.

The filter characteristics in FIG. 3 are shown only by way of example and various modification of the filter characteristics is possible. The characteristics of the de-emphasis filter 16 need not consist only of a characteristic which restrains the level of a component in a predetermined high frequency region relating to this invention but may be a characteristic combined with a normal filter characteristic used for establishing and controlling a tone color.

The establishment and control of the characteristics of the pre-emphasis filter 22 and the de-emphasis filter 16 need not necessarily be realized by the above described construction in which the filter coefficient is controlled as in the above described embodiment but may be realized by a construction in which filters of different characteristics are provided in parallel and one with a suitable characteristic is selected from among these filters.

In the above described embodiment, the tone signal generation device according to the invention is applied to a tone source for notes corresponding to respective keys in the keyboard. The invention however may be applied to a tone source for other tones including rhythm tones.

What is claimed is:

1. A tone signal generation device for an electronic musical instrument comprising:

memory means for storing waveshape data representing a tone waveshape having plural periods, the tone waveshape having the level of frequency components constituting said tone waveshape being previously elevated in a predetermined high frequency region corresponding to a frequency region to which quantization noise components of said tone waveshape belong;

reading means for reading out said waveshape data from said memory means; and filter means for receiving said tone waveshape and for restraining the level of the components in said predetermined high frequency region, thereby said quantization noise being reduced without impairing the level of the signal component.

2. A tone signal generation device as defined in claim 1 which further comprises tone color selection means for selecting a tone color to be imparted to said tone waveshape among plural kinds of tone colors; and wherein said filter means changes the restraint of said components in said predetermined high frequency region in accordance with the selected tone color.

3. A tone signal generation device as defined in claim 1 wherein the restrained high frequency level is substantially equal to the previously elevated high frequency level.

4. A tone signal generation device as defined in claim 1 wherein the restrained high frequency level is not substantially equal to the previously elevated high frequency level.

5. A tone signal generation device as defined in claim 1 wherein said filter means is constructed of a digital filter.

6. A tone signal generation device as defined in claim 1 wherein the characteristic in which the level elevation characteristic of the tone waveshape data stored in said waveshape memory is such that the level is gradually elevated as the frequency becomes higher in a predetermined first high frequency region and is maintained at a constant elevated level in a second high frequency region which is higher than the first high frequency region, and the restraining characteristic of said filter is such that the level is gradually restrained as the frequency becomes higher in the predetermined first high frequency region and is maintained at a constant restrained level in the second high frequency region.

7. A method for sampling and reproducing a received tone signal comprising the steps:

sampling and quantizing the received tone signal;

filtering the tone signal by a pre-emphasis filter, said pre-emphasis filter being established to a characteristic in which the amount of amplitude attenuation in a predetermined high frequency region to which quantization noise components belong is smaller than the amount of amplitude attenuation in a frequency region which is lower than said predetermined high frequency region;

storing the filtered and quantized tone signal data in a memory;

reading out the tone signal data stored in said memory; and filtering the tone signal data read out from said memory by a de-emphasis filter which is established to a characteristic in which the amount of amplitude attenuation in said predetermined high frequency region to which said quantization noise components belong is larger than the amount of amplitude attenuation in the frequency region which is lower than said predetermined high frequency region.

8. A method as set out in claim 7, wherein said step of filtering the tone signal is performed before the step of sampling and quantizing the tone signal.

9. A method as set out in claim 7, wherein said step of filtering the tone signal is performed after the step of sampling and quantizing the tone signal.

* * * * *